United States Patent [19]

Bleiweiss et al.

[11] 4,205,366
[45] May 27, 1980

[54] EMERGENCY WARNING LAMP

[75] Inventors: Arthur F. Bleiweiss; Dumitru Cotoara, both of Toronto; Robert J. Willkes, Caledon East, all of Canada

[73] Assignee: Dominion Auto Accessories Limited, Toronto, Canada

[21] Appl. No.: 754,125

[22] Filed: Dec. 27, 1976

[51] Int. Cl.² .............................................. F21Q 1/00
[52] U.S. Cl. ...................................... 362/35; 340/84; 362/272; 362/294
[58] Field of Search ................... 240/7.1 E, 46.1, 47, 240/49, 61.13; 340/50, 84, 90; 362/35, 272, 294

[56] References Cited

U.S. PATENT DOCUMENTS

| | | | |
|---|---|---|---|
| 2,719,282 | 9/1955 | Roth | 240/49 X |
| 2,740,103 | 3/1956 | Gosswiller | 340/50 |
| 2,936,441 | 5/1960 | English et al. | 340/50 |
| 3,781,538 | 2/1973 | Brudy et al. | 240/49 |
| 3,953,726 | 4/1976 | Scarritt, Sr. | 240/41.6 X |

FOREIGN PATENT DOCUMENTS 931722  7/1963  United Kingdom ..................... 362/35

Primary Examiner—Michael L. Gellner
Attorney, Agent, or Firm—Barnes, Kissele, Raisch & Choate

[57] ABSTRACT

An emergency warning lamp comprising a base, a mounting plate mounted on the base, and an electric motor mounted on the plate having an output shaft extending upwardly through the plate. A bushing is disposed centrally of the base on the plate, and a plastic gear is rotatably mounted on the bushing. A pinion meshes with the gear and is fixed to the shaft of the motor. A lamp bulb is mounted on the bushing. A heat shield overlies the gears and is supported by one of the gears for rotation. A reflector is mounted on the heat shield for rotation therewith. Electrical leads extend from a source of power, one of the leads comprising a ground lead and the others comprising power leads. One of the power leads extends through the bushing to the lamp. The other of the power leads extends to the winding of the motor. The housing of the motor is grounded to the metal plate and the ground lead is connected to the metal plate. The current flows through the bulb to the bushing and in turn to the mounting plate.

3 Claims, 6 Drawing Figures

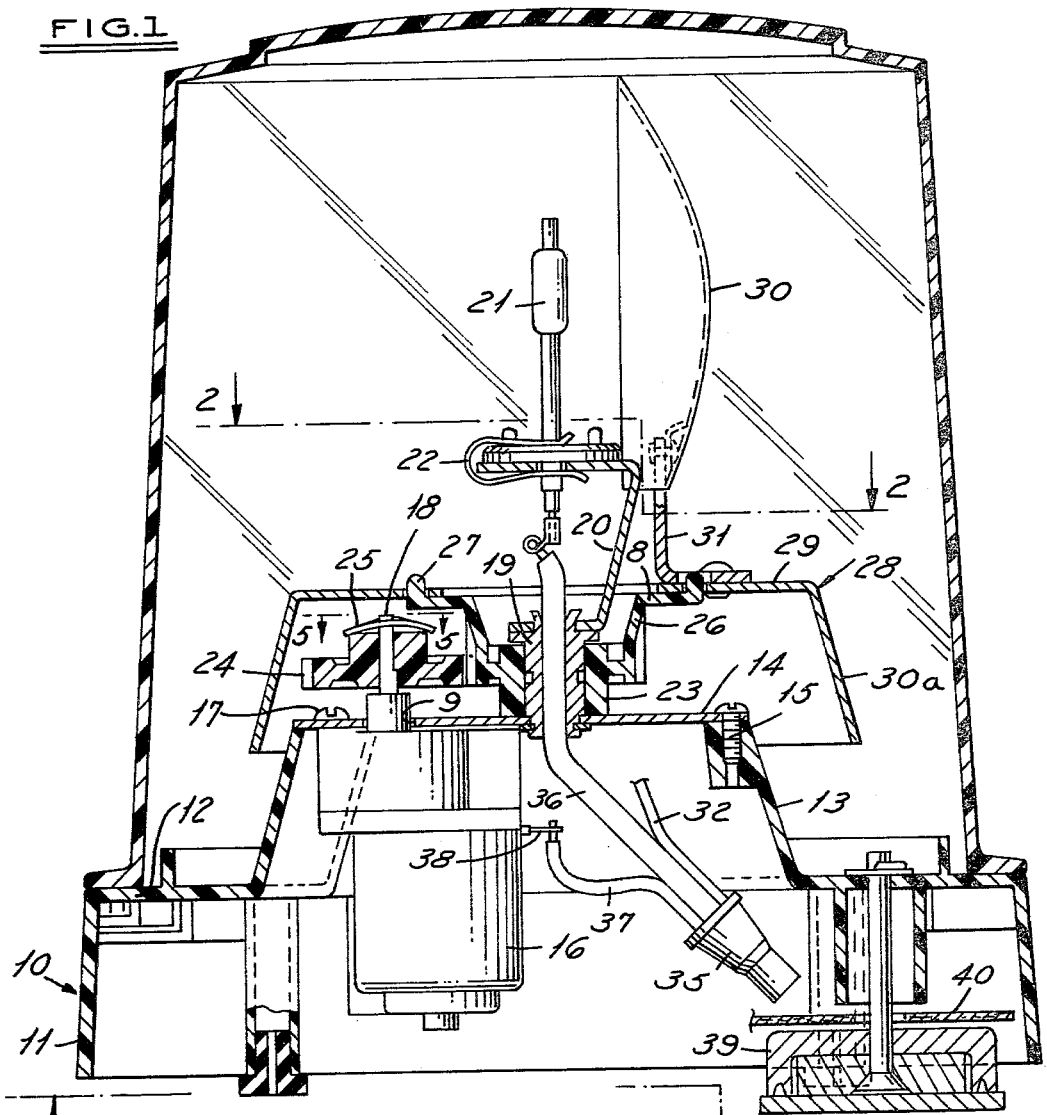
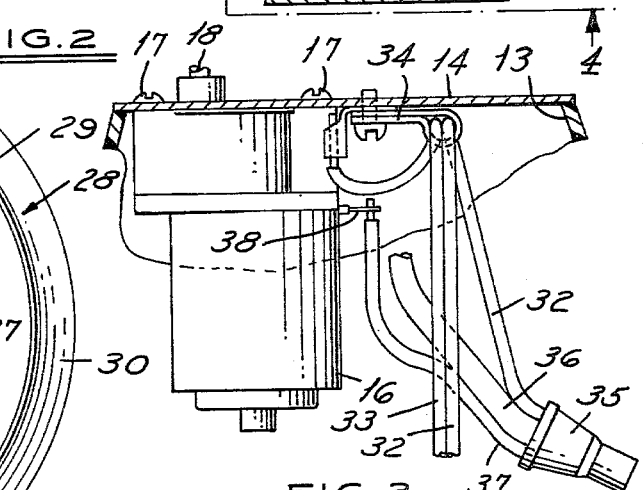

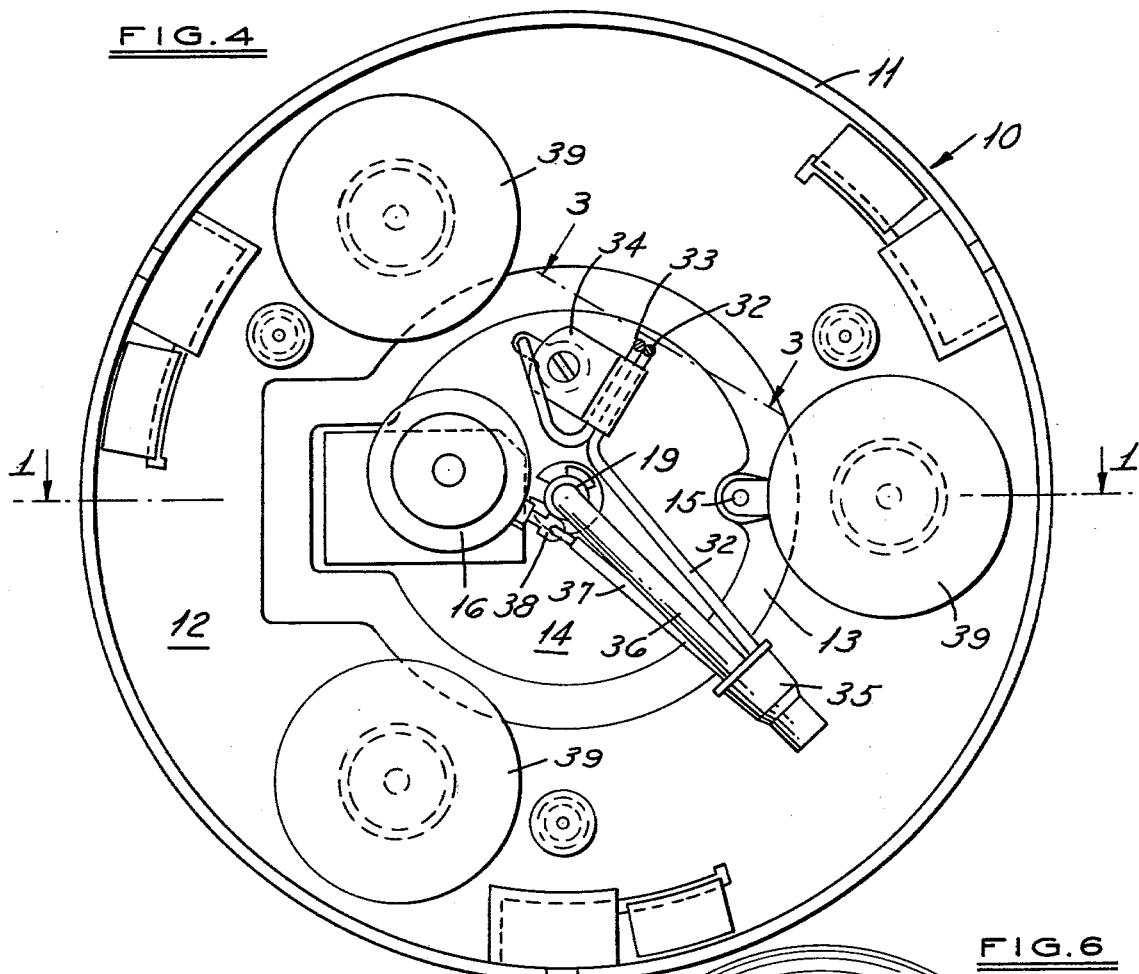
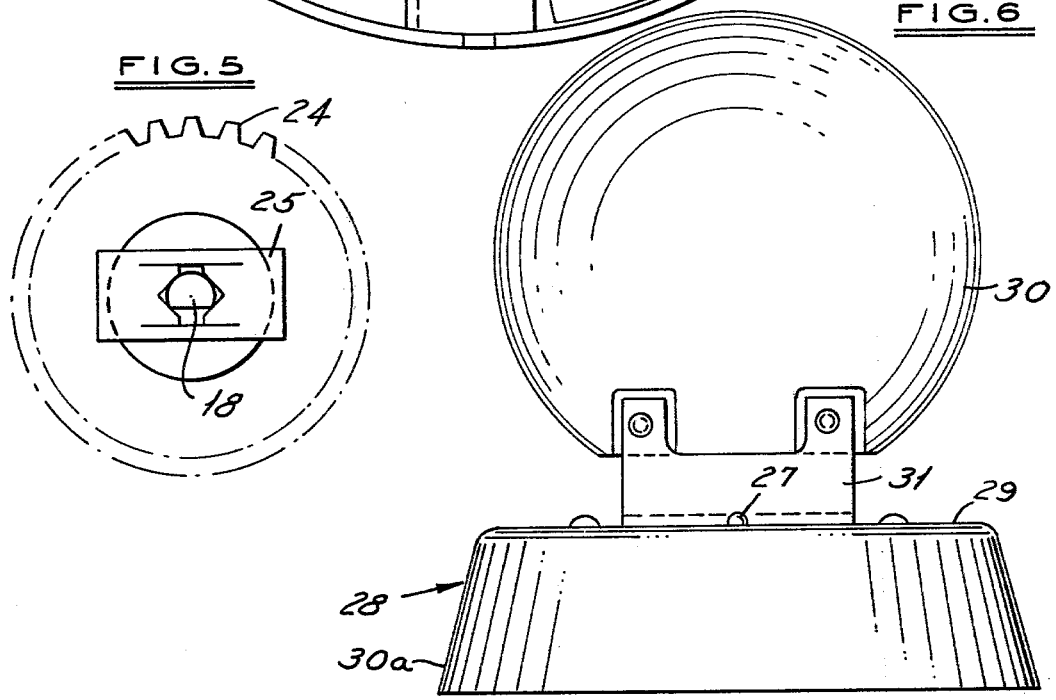

EMERGENCY WARNING LAMP

BACKGROUND AND SUMMARY OF THE INVENTION

In emergency warning lamps, it is common to provide a base upon which either or both the light source and reflector are rotated. In making an emergency warning lamp of light weight, low cost construction and utilizing plastics, a major problem is that the heat from the light source or the environment in which the lamp is used tends to distort the plastic in use and overheat the motor. Another problem is that the current applied to the lamp tends to cause wear and pitting of the bearings when the current is passed through the bearing. It has heretofore been suggested that brush connections can be used to avoid the passage of current through the bearings of the rotating shaft, for example, as shown in U.S. Pat. No. 3,781,538.

The present invention is directed to making an emergency warning lamp wherein the excessive heating is obviated and wherein the passage of current through the bearings is obviated without the use of brushes and allows the use of higher powered bulbs which radiate more heat.

DESCRIPTION OF THE DRAWINGS

FIG. 1 is a part sectional elevational view of an emergency warning lamp embodying the invention.

FIG. 2 is a fragmentary sectional view taken along the line 2—2 in FIG. 1.

FIG. 3 is a fragmentary sectional view taken along the line 3—3 in FIG. 4.

FIG. 4 is a bottom plan view of the same taken along the line 4—4 in FIG. 1, parts being broken away.

FIG. 5 is a fragmentary plan view taken along the line 5—5 in FIG. 1.

FIG. 6 is a side elevational view of the heat shield and reflector.

DESCRIPTION

Referring to FIG. 1, the emergency warning lamp embodying the invention comprises a plastic base 10 that includes a peripheral wall 11, an annular horizontal wall 12 and a frusto-conical wall 13 spaced inwardly from the peripheral wall 11 and having an open end on which a metallic mounting plate 14 is supported by screws 15. A combined motor and gear assembly 16 is supported on the mounting plate 14 by screws 17 and has a shaft 18 that extends upwardly through an opening 9 in the plate 14.

A fixed metal bushing 19 is mounted centrally of the face on the plate 14 and supports a bracket 20 that serves as a mount or support for a bulb 21 such as a halogen lamp. The bulb is mounted on the bracket 20 by clip 22. A gear 23 of plastic, such as acetal resin, is rotatably mounted on the bushing 19 and a pinion 24 fixed on the shaft 18 of the gear and motor assembly 16 meshes with the gear 23 to rotate the same. Pinion 24 is held in position on the shaft by a clip 25.

The gear 23 includes an upwardly extending wall 26 having a flange 8 that has axial protrusions 27 that extend into openings in a heat shield 28 that has a horizontal portion 29 and a peripheral portion 30a which surrounds the upper end of the portion 13 of the base 11. In this manner, the heat shield 28 is supported on gear 23.

In addition, a reflector 30 is mounted on the horizontal portion 29 of the heat shield 28 by a bracket 31. In this manner, operation of the motor rotates the gear 23 through pinion 24 and, in turn, rotates the heat shield 28 and the reflector 30 with respect to the bulb 21 that remains in fixed position.

Power is supplied from an external source, such as a plug, that may plug into the cigaret lighter connector of an automobile and includes two power wires 32, 33 that extend to a bracket 34 on plate 14. Wire 33 is grounded to mounting plate 14 while wire 32 extends to a connector 35 for making a connection to wires 36, 37. Wire 36 extends through bushing 19 to the bulb 21. A circuit is completed to ground from bulb 21 through clip 22, bracket 20 and bushing 19 to the grounded plate 14. Wire 37 extends to the winding connector 38. The winding of the motor 16 is grounded through the motor housing to the plate 14 to complete a circuit.

Suitable supports can be used for mounting the base, such as magnets 39.

In order to provide further insulation, a dust sheet 40 of suitable material, such as vulcanized fiber, is mounted beneath the motor 16 and extends over the entire area surrounded by wall 11.

We claim:

1. In an emergency warning lamp, the combination comprising
   a plastic base having a top wall and a peripheral wall,
   said top wall including a generally frustoconical wall spaced radially inwardly of said peripheral wall,
   a generally horizontal metal mounting plate mounted on said frustonconical wall base,
   an electric motor mounted on said plate and having an output shaft extending upwardly through said plate,
   a bushing disposed centrally of said base on said plate,
   a gear rotatably mounted on said bushing,
   a pinion meshing with said gear and fixed to the shaft of said motor,
   a heat shield overlying said gears,
   said heat shield including a flat horizontal wall and a peripheral wall,
   said horizontal wall of said heat shield having a central opening therethrough,
   means for supporting said heat shield on said gear on said bushing for rotation with said gear on said bushing
   a lamp bulb,
   mounting means on said bushing extending through said opening in the horizontal wall of said heat shield for supporting said lamp bulb in spaced relation to said bushing,
   a reflector,
   means for mounting said reflector on said horizontal wall of said heat shield for rotation therewith so that it is adjacent said lamp bulb,
   the frustoconical portion of said base extending axially upwardly within said peripheral wall of said heat shield.

2. The combination set forth in claim 1 wherein said gear is made of electrically non-conductive material.

3. The combination set forth in claim 1 wherein said pinion is made of electrically non-conductive material.

* * * * *